United States Patent
DeLuca et al.

(10) Patent No.: US 10,614,164 B2
(45) Date of Patent: Apr. 7, 2020

(54) MESSAGE SENTIMENT BASED ALERT

(71) Applicant: International Business Machines Corporation, Armonk, NY (US)

(72) Inventors: Lisa Seacat DeLuca, Baltimore, MD (US); Jeremy A. Greenberger, Raleigh, NC (US); Zachary M. Greenberger, Raleigh, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 213 days.

(21) Appl. No.: 15/442,973

(22) Filed: Feb. 27, 2017

(65) Prior Publication Data

US 2018/0248746 A1    Aug. 30, 2018

(51) Int. Cl.
| | |
|---|---|
| *H04L 12/24* | (2006.01) |
| *G06F 17/27* | (2006.01) |
| *H04L 29/08* | (2006.01) |
| *H04L 12/58* | (2006.01) |
| *H04W 4/12* | (2009.01) |

(52) U.S. Cl.
CPC ............ *G06F 17/279* (2013.01); *H04L 51/02* (2013.01); *H04L 51/046* (2013.01); *H04L 51/26* (2013.01); *H04L 67/22* (2013.01); *H04L 67/30* (2013.01); *H04L 67/10* (2013.01); *H04L 67/26* (2013.01); *H04W 4/12* (2013.01)

(58) Field of Classification Search
CPC ......... H04L 51/04; H04L 67/22; H04L 67/30; H04L 67/10; H04L 67/26; G06F 17/279; H04W 4/12
See application file for complete search history.

(56) References Cited

U.S. PATENT DOCUMENTS

| | | | |
|---|---|---|---|
| 7,983,701 B2 | 7/2011 | Bell et al. | |
| 8,718,610 B2 | 5/2014 | Backlund et al. | |
| 8,838,438 B2 | 9/2014 | Leary et al. | |
| 9,015,033 B2 | 4/2015 | De Andrade Barbosa et al. | |
| 9,485,212 B1 * | 11/2016 | Bastide | H04L 51/32 |
| 9,715,492 B2 | 7/2017 | Skiba et al. | |
| 2010/0312769 A1 * | 12/2010 | Bailey | G06F 16/95 |
| | | | 707/740 |
| 2011/0246179 A1 * | 10/2011 | O'Neil | G06F 17/2765 |
| | | | 704/9 |
| 2012/0296845 A1 * | 11/2012 | Andrews | G06Q 40/06 |
| | | | 705/36 R |
| 2012/0316916 A1 * | 12/2012 | Andrews | G06Q 40/08 |
| | | | 705/7.28 |
| 2013/0325550 A1 * | 12/2013 | Varghese | H04W 4/21 |
| | | | 705/7.31 |
| 2014/0195255 A1 * | 7/2014 | Ghosh | G06F 19/3418 |
| | | | 705/2 |

(Continued)

*Primary Examiner* — Oanh Duong
(74) *Attorney, Agent, or Firm* — Maeve Carpenter, Esq.; George S. Blasiak, Esq.; Heslin Rothenberg Farley & Mesiti P.C.

(57) ABSTRACT

Methods, computer program products, and systems are presented. The method computer program products, and systems can include, for instance: obtaining textual based message data of a messaging system; processing the textual based message data to determine one or more sentiment parameter associated to the textual based message data; and outputting an alert based on a result of the processing.

19 Claims, 9 Drawing Sheets

(56) References Cited

U.S. PATENT DOCUMENTS

| | | | |
|---|---|---|---|
| 2016/0034571 A1* | 2/2016 | Setayesh | G06F 16/353 |
| | | | 707/738 |
| 2016/0042371 A1* | 2/2016 | Klemm | G06Q 30/0203 |
| | | | 705/7.32 |
| 2017/0352069 A1* | 12/2017 | DeLuca | G06Q 30/0282 |
| 2018/0018581 A1* | 1/2018 | Cook | H04L 67/42 |
| 2018/0095652 A1* | 4/2018 | Branch | G06F 3/04847 |
| 2018/0097755 A1* | 4/2018 | Mody | H04L 51/063 |
| 2018/0165582 A1* | 6/2018 | Cha | H04L 51/046 |
| 2018/0167347 A1* | 6/2018 | Patierno | H04L 51/10 |
| 2018/0176312 A1* | 6/2018 | Smietana | H04L 67/22 |
| 2018/0217968 A1* | 8/2018 | Bastide | G06F 17/241 |

* cited by examiner

MESSAGE SENTIMENT BASED ALERT

BACKGROUND

The present disclosure relates to computer networks generally and more particularly a messaging system.

A social network is a social structure made up of individuals (or organizations) called "nodes" which are tied (connected) by one or more specific types of interdependency, such as friendship, kinship, common interest, financial exchange, dislike, beliefs or knowledge. In its simplest form, a social network is a map of specified ties, such as friendship, between the nodes being studied. The nodes to which an individual is thus connected are the social contacts of that individual. The network can also be used to measure social capital—the value that an individual gets from the social network. These concepts are often displayed in a social network diagram, where nodes are the points and the ties are the lines.

Examples of computer implemented social networks include FACEBOOK® (Facebook is a registered trademark of Facebook, Inc.), TWITTER® (Twitter is a registered trademark of Twitter, Inc.), LINKEDIN® (LinkedIn is a registered trademark of LinkedIn Corporation), or INSTAGRAM® (Instagram is a registered trademark of Instagram, LLC). Computer implemented social networks incorporate messaging systems that are capable of receiving and transmitting messages to client computers of participant users of the messaging systems. Messaging systems can also be incorporated in systems that have minimal or no social network attributes. A messaging system can be provided by a short message system (SMS) text message delivery service of a mobile phone cellular network provider, or an email delivery system.

SUMMARY

Shortcomings of the prior art are overcome, and additional advantages are provided, through the provision, in one aspect, of a method. The method can include, for example: obtaining textual based message data of a messaging system, the textual based message data being data of a textual based message defined by a first user of the messaging system for sending to a second user of the messaging system; processing the textual based message data to determine one or more sentiment parameter associated to the textual based message data; and outputting an alert based on a result of the processing, wherein the outputting includes outputting the alert to the second user.

In another aspect, a computer program product can be provided. The computer program product can include a computer readable storage medium readable by one or more processing unit and storing instructions for execution by one or more processor for performing a method. The method can include, for example: obtaining textual based message data of a messaging system, the textual based message data being data of a textual based message defined by a first user of the messaging system for sending to a second user of the messaging system; processing the textual based message data to determine one or more sentiment parameter associated to the textual based message data; and outputting an alert based on a result of the processing, wherein the outputting includes outputting the alert to the second user.

In a further aspect, a system can be provided. The system can include, for example a memory. In addition, the system can include one or more processor in communication with the memory. Further, the system can include program instructions executable by the one or more processor via the memory to perform a method. The method can include, for example: obtaining textual based message data of a messaging system, the textual based message data being data of a textual based message defined by a first user of the messaging system for sending to a second user of the messaging system; processing the textual based message data to determine one or more sentiment parameter associated to the textual based message data; and outputting an alert based on a result of the processing, wherein the outputting includes outputting the alert to the second user.

Shortcomings of the prior art are overcome, and additional advantages are provided, through the provision, in one aspect, of a method. The method can include, for example: obtaining textual based message data of a messaging system, the textual based message data being data of a textual based message defined by a first user of the messaging system for sending to a second user of the messaging system; processing the textual based message data to determine one or more Natural Language Processing (NLP) output parameter associated to the textual based message data; and outputting an alert based on a result of the processing, wherein the outputting includes outputting the alert to the second user.

In another aspect, a computer program product can be provided. The computer program product can include a computer readable storage medium readable by one or more processing unit and storing instructions for execution by one or more processor for performing a method. The method can include, for example: obtaining textual based message data of a messaging system, the textual based message data being data of a textual based message defined by a first user of the messaging system for sending to a second user of the messaging system; processing the textual based message data to determine one or more NLP output parameter associated to the textual based message data; and outputting an alert based on a result of the processing, wherein the outputting includes outputting the alert to the second user.

In a further aspect, a system can be provided. The system can include, for example a memory. In addition, the system can include one or more processor in communication with the memory. Further, the system can include program instructions executable by the one or more processor via the memory to perform a method. The method can include, for example: obtaining textual based message data of a messaging system, the textual based message data being data of a textual based message defined by a first user of the messaging system for sending to a second user of the messaging system; processing the textual based message data to determine one or more NLP output parameter associated to the textual based message data; and outputting an alert based on a result of the processing, wherein the outputting includes outputting the alert to the second user.

Additional features are realized through the techniques set forth herein. Other embodiments and aspects, including but not limited to methods, computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
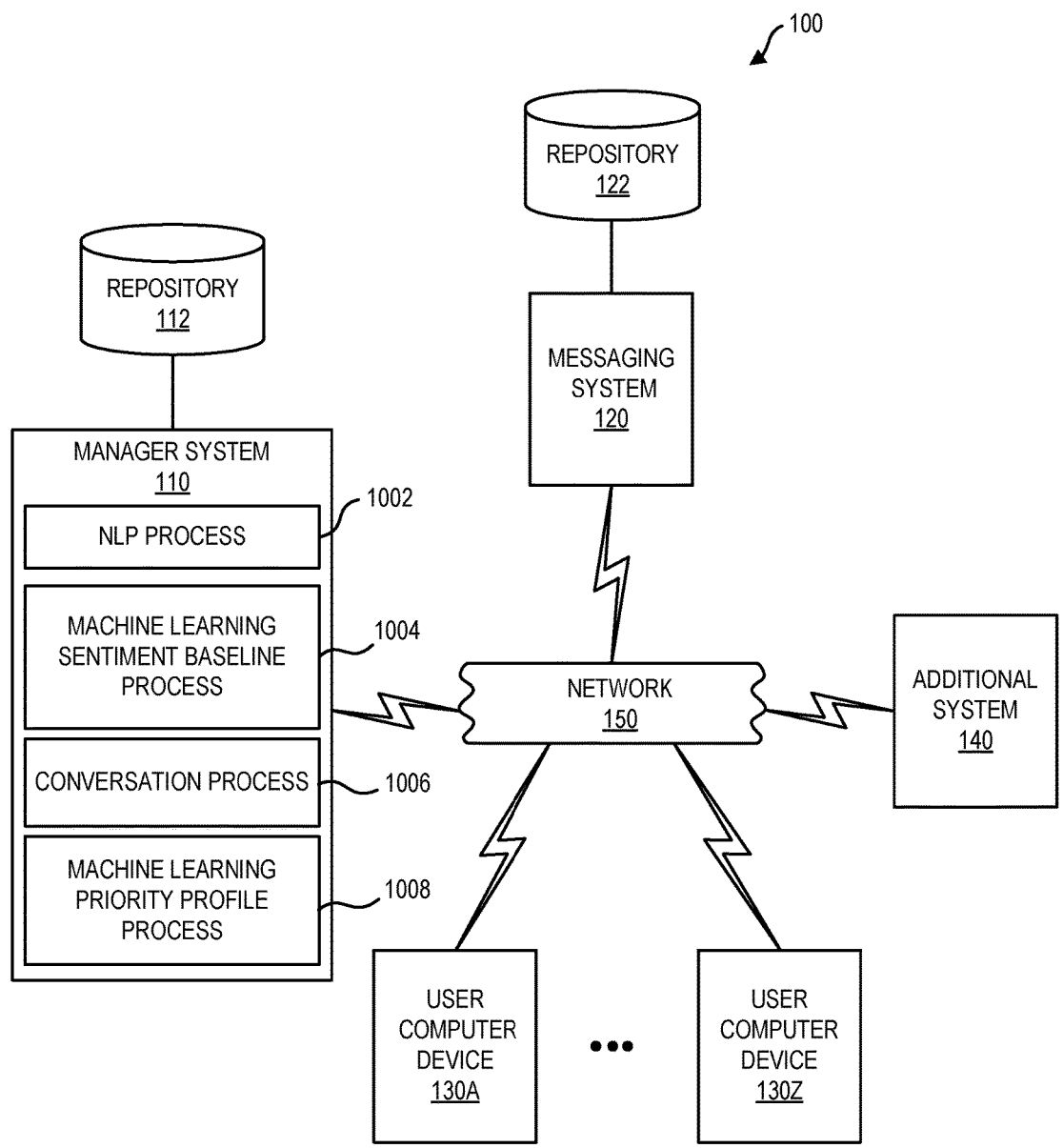
FIG. 1 depicts a system having a manager system, or messaging system and one or more user computer device, according to one embodiment.

FIG. 1 is a block diagram of a system 100, in accordance with an embodiment as set forth herein. In the embodiment of FIG. 1, system 100 includes numerous devices, which may be or include computing nodes 10 as described herein, connected by a network 150. For example, network 150 can be a physical network or a virtual network. A physical network can be, for example, a physical telecommunications network connecting numerous computer nodes or systems, such as computer servers and computer clients. By contrast a virtual network can, for example, combine numerous physical networks or parts thereof into a logical virtual network. In another example, numerous virtual networks can be defined over a single physical network.

By way of explanation, FIG. 1 depicts an example environment. In one embodiment, system 100 can include a manager system 110, a messaging system 120 for support of textual based messages, one or more user computer device 130A-130Z, and one or more additional system 140. Each of the different user computer devices 130A-130Z can be associated to a different user. Messaging system 120 can run message delivery process for delivering textual based messages between users of different computer devices 130A-130Z. Manager system 110 can run a Natural Language Processing (NLP) process 1002 for determining one or more NLP output parameter of a message. NLP process 1002 can include one or more of a topic classification process that determines topics of messages and output one or more topic NLP output parameter, a sentiment analysis process which determines sentiment parameter for a message, e.g. polar sentiment NLP output parameters, "negative," "positive," and/or non-polar NLP output sentiment parameters, e.g. "anger," "disgust," "fear," "joy," and/or "sadness" or other classification process for output of one or more other NLP output parameters e.g. one of more "social tendency" NLP output parameter or one or more "writing style" NLP output parameter. Manager system 110 can run a machine learning sentiment baseline process 1004 for cognitively determining and updating one or more sentiment baseline for one or more user. Manager system 110 can run a conversation process 1006 for analyzing a textual based conversation between a group of two or more users. Manager system 110 can run a machine learning priority profile process 1008 for registering profiles of received messages as priority profiles. When a received message has a profile matching a priority profile according to a matching criteria (which can tolerate inexact matches), manager system 110 can associate an alert condition to the received message.

Messaging system 120 can be included in a social network. Examples of computer implemented social networks include FACEBOOK® (Facebook is a registered trademark of Facebook, Inc.), TWITTER® (Twitter is a registered trademark of Twitter, Inc.), LINKEDIN® (LinkedIn is a registered trademark of LinkedIn Corporation), or INSTAGRAM® (Instagram is a registered trademark of Instagram, LLC). Computer implemented social networks incorporate messaging systems that are capable of receiving and transmitting messages to client computers of participant users of the messaging systems. Messaging systems can also be incorporated in systems that have minimal or no social network attributes. A messaging system can be provided by a short message system (SMS) text message delivery service of a mobile phone cellular network provider, or an email delivery system.

In one embodiment manager system 110 can be external to messaging system 120 and to each of the one or more user computer device 130A-130Z. In one embodiment manager system 110 can be co-located with messaging system 120. In one embodiment manager system 110 can be co-located with one or more user computer device 130A-130Z.

Figures 2, 3:
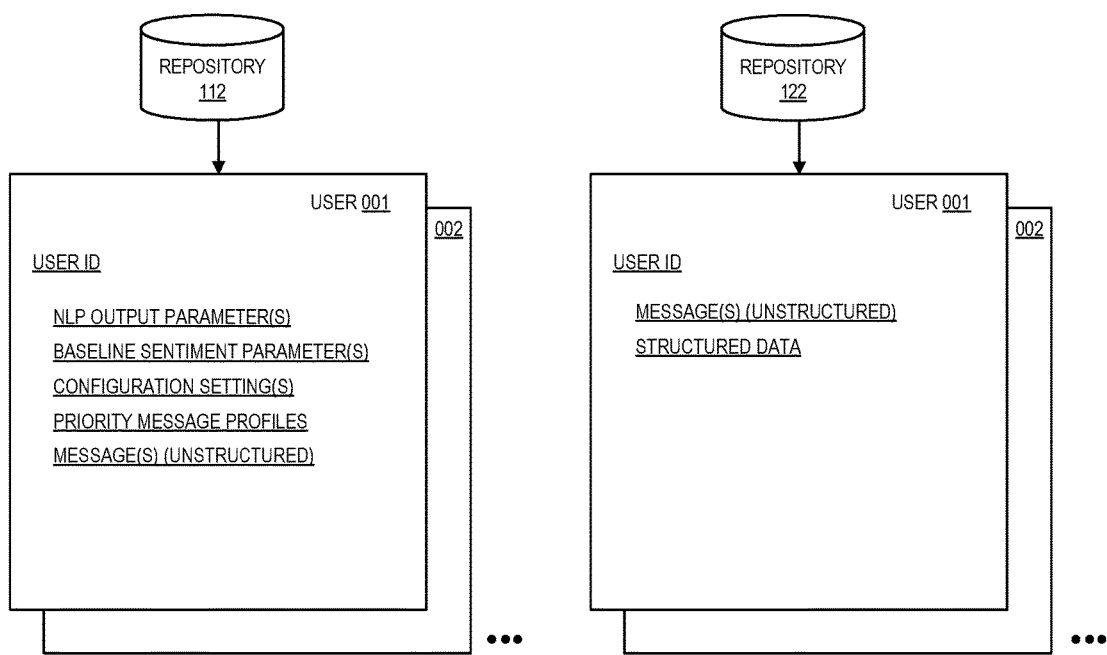
FIG. 2 depicts content of a data repository of a manager system according to one embodiment.
FIG. 3 depicts content of a data repository of a messaging system according to one embodiment.

Manager system 110 can have an associated data repository 112 as is further described in reference to FIG. 2. Data repository 112 can have history data for each of several users 001, 002. History data of repository 112 can include unstructured data and/or structured data for each of several users 001, 002. Data repository 112 of manager system 110 can include a user ID and associated contact information for each user. In one embodiment, data repository 112 can include one or more sentiment parameter for each of several past messages. Data repository 112 can also store one or more baseline sentiment parameter for each of several users 001, 002. Data repository 112 can include user defined configuration settings that define operational aspects of manager system 110 such as the manner of analyzing of textual based messages and the manner of outputting an alert as set forth herein.

Messaging system 120 can have an associated data repository 122 as is further described in FIG. 3 that stores user data for each of a plurality of users 001, 002. The user data can include a user ID and associated contact information for each user. User data can also include user preference data. User data can also include unstructured data such as a history of textual based messages of the user. User data of repository 122 can also include structured data resulting from processing of unstructured data.

Regarding one or more user computer device 130A-130Z, a computer device of one or more user computer device 130A-130Z in one embodiment can be a computing node based device provided by a client computer, e.g. a mobile device, e.g. a smartphone or tablet, a laptop or PC that runs one or more program including e.g. a web browser for browsing web pages.

Figure 4:
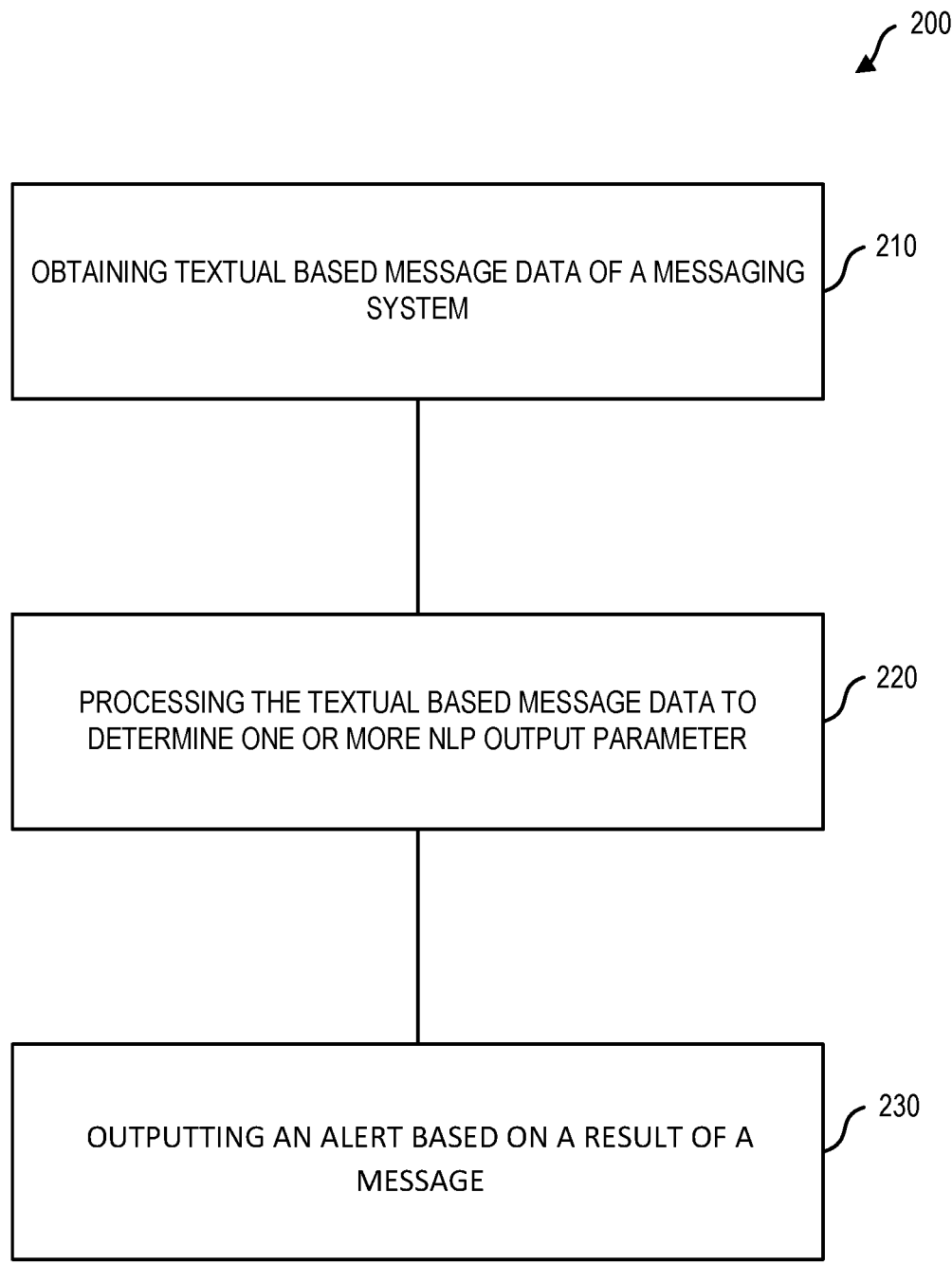
FIG. 4 depicts a flowchart illustrating method for use in outputting alerts according to one embodiment.

FIG. 4 is a flowchart illustrating a method 200 in accordance with one or more aspects set forth herein. At block 210 method 200 can include obtaining textual based message data of a messaging system. At block 220 method 200 can include processing the textual based message data to determine one or more Natural Language Processing (NLP) output parameter associated to the textual based message data. At block 230 method 200 can include outputting an alert based on a result of the processing. In one embodiment, block 220 can be performed by processing the textual based message data to determine one or more sentiment parameter.

In one embodiment, performing the outputting at block 230 can include sending a communication to control one or more indicator of user computer device. In one embodiment, performing the outputting at block 230 can include triggering certain operation of one or more indicator of user computer device. In one embodiment the outputting at block 230 can include changing a control of an indication, e.g. volume, brightness, font characteristic, tactile force and/or timing. In one embodiment, the outputting at block 230 in addition or alternatively to being based on a result of processing at block 210 can be based on such criteria e.g. as (a) a baseline sentiment parameter for one or more user, (b) a configuration setting of one or more user, and/or (c) a context of a textual based conversation between users.

Figure 5:
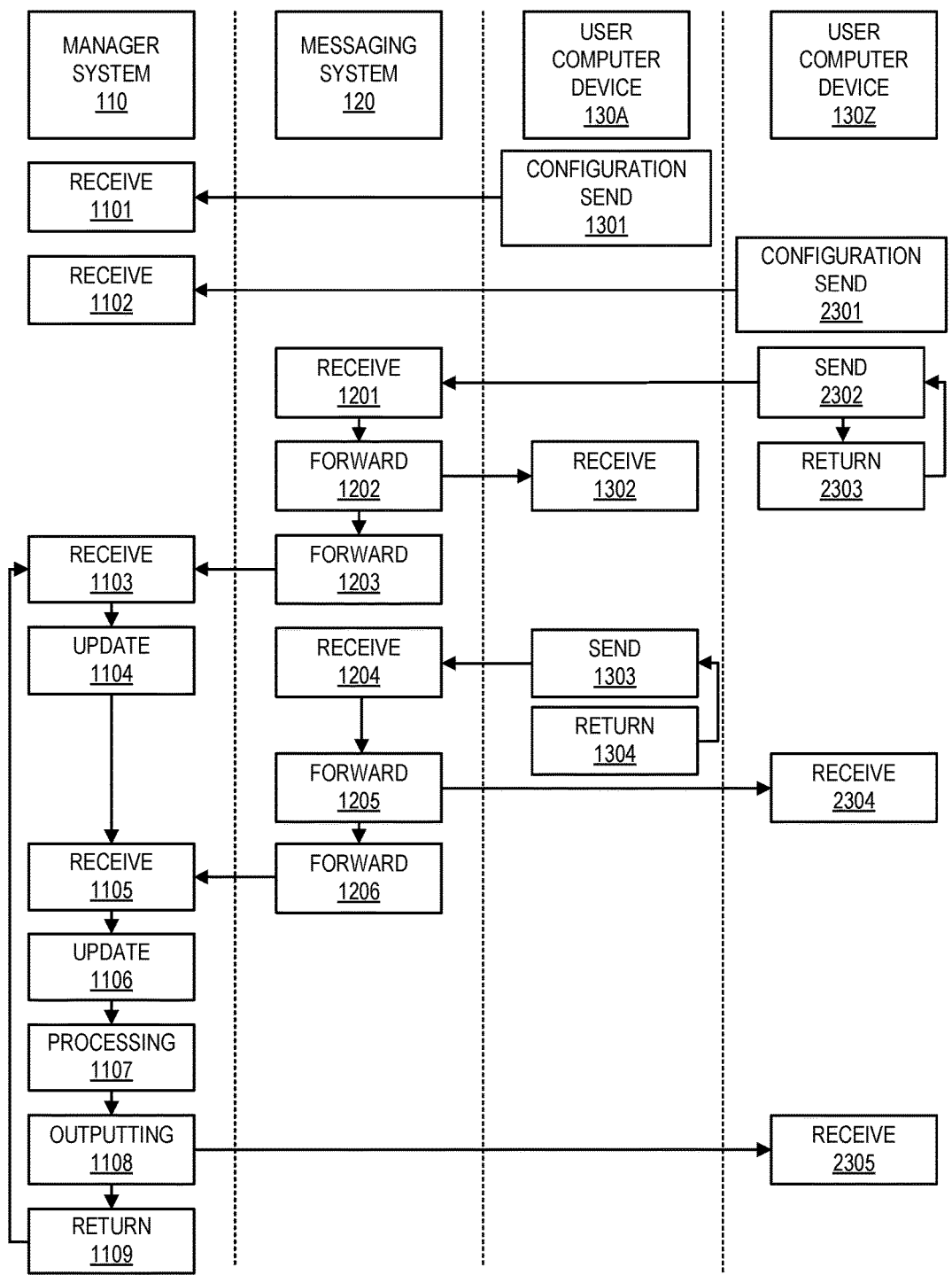
FIG. 5 is a flowchart depicting a method for use in outputting alerts according one embodiment.

A flowchart illustrating in one embodiment operation of system 100 is shown in FIG. 5, wherein exemplary functions are described with respect to manager system 110, messaging system 120 and first and second user computer devices 130A and 130Z used respectively by first and second different users. Functions of manager system 110 described in reference to FIG. 5 set forth exemplary functions in accordance with method 200 in one embodiment as set forth in connection with the flowchart of FIG. 4 in one embodiment.

At block 1301 computer device 130A can establish configuration settings based on one or more user entered input entered by a user into a user interface into computer device 130A and can send configuration settings defined by the one or more user entered input to manager system 110 for receipt by manager system 110 at block 1101. At block 2301 computer device 130A can establish configuration settings based on one or more user entered input entered by a user into a user interface into computer device 130Z and can send configuration settings defined by the one or more user entered input to manager system 110 for receipt by manager system 110 at block 1102. The configuration settings can include e.g. setting defining rules for performing processing of message data, operational aspects of notifications, and/or criteria for use in determining an output of a notification.

At block 2302 computer device 130Z can send a textual based message defined by a second user responsively to the textual based message being entered into computer device 130Z by the second user using a user interface of computer device 130A. The textual based message sent at block 2302 can be a message for sending to computer device 130A. For sending of the message to computer device 130A the message sent at block 2302 can be sent to messaging system 120 received by messaging system 120 at block 1201 and forwarded to computer device 130A at block 1202 for receipt by computer device 130A at block 1302.

At block 1303 computer device 130A can send a textual based message defined by a first user responsively to the textual based message being entered into computer device 130A by the first user using a user interface of computer device 130A. The textual based message sent at block 1303 can be a message for sending to computer device 130Z. For sending of the message to computer device 130Z the message sent at block 1303 can be sent to messaging system 120 received by messaging system 120 at block 1204 and forwarded to computer device 130Z at block 1205.

The message received by messaging system 120 at block 1201 can be forwarded to manager system 110 at block 1203 and can be received by manager system 110 at block 1103. The message received by messaging system 120 at block 1204 can be forwarded to manager system 110 at block 1206 for receipt by manager system 110. At block 1107 manager system 110 can perform processing of a message e.g. the textual based message received at block 1105 defined by the first user for determining one or more sentiment parameter of the textual based message.

For performing processing at block 1107 manager system 110 can activate NLP process 1002. For performance of NLP processing activated by activation of NLP process 1002 manager system 110 can perform one or more of (a) topic classification and output of one or more topic NLP output parameter for a received message (b) sentiment classification and output of one or more sentiment NLP output parameter for a received message or (c) other NLP classifications and output of one or more other NLP output parameter for the received message, perform natural language analysis, text analysis and/or computational linguistics to identify and extract subjective information in source materials.

Topic analysis for topic classification and output of NLP output parameter can include topic segmentation to identify several topics within a message. Topic analysis can apply a variety of technologies e.g. one or more of Hidden Markov model (HMM), artificial chains, passage similarities using word co-occurrence, topic modeling, or clustering. Sentiment analysis for sentiment classification and output of one or more sentiment NLP parameter can determine the attitude of a speaker or a writer with respect to some topic or the overall contextual polarity of a document. The attitude may be the author's judgment or evaluation, affective state (that is to say, the emotional state of the author when writing), or the intended emotional communication (that is to say, the emotional effect the author wishes to have on the reader).

In one embodiment sentiment analysis can classify the polarity of a given text at the document, sentence, or feature/aspect level—whether the expressed opinion in a document, a sentence or an entity feature/aspect is positive, negative, or neutral. Advanced sentiment classification can classify beyond a polarity of a given text. Advanced sentiment classification can classify emotional states as sentiment classifications. Sentiment classifications can include the classification of "anger," "disgust," "fear," "joy," and "sadness."

In one embodiment, determining sentiment can include use of a scaling system whereby words commonly associated with having a negative, neutral or positive sentiment with them are given an associated number on a −10 to +10 scale (most negative up to most positive). Accordingly, it can be possible to adjust the sentiment of a given term relative to its environment (usually on the level of the sentence). When a piece of unstructured text is analyzed using natural language processing, each concept in the specified environment can be given a score based on the way sentiment words relate to the concept and its associated score. Accordingly, it can be possible to adjust the sentiment value of a concept relative to modifications that may surround it. Words, for example, that intensify, relax or negate the sentiment expressed by the concept can affect its score. Alternatively, text can be given a positive and negative sentiment strength score if the goal is to determine the sentiment in a text rather than the overall polarity and strength of the text.

Performing sentiment analyses can include use of knowledge based techniques, statistical methods, and/or hybrid approaches. Knowledge-based techniques classify text by affect categories based on the presence of unambiguous affect words such as "happy", "sad", "afraid", and "bored".

Some knowledge bases not only list obvious affect words, but also assign arbitrary words a probable "affinity" to particular emotions.

Statistical methods can leverage elements from machine learning such as latent semantic analysis, support vector machines, "bag of words," semantic orientation, and pointwise mutual information. More sophisticated methods can detect the holder of a sentiment (i.e., the person who maintains that affective state) and the target (i.e., the entity about which the affect is felt). To mine the opinion in context and obtain the feature which has been opinionated, the grammatical relationships of words can be used. Grammatical dependency relations are obtained by deep parsing of the text. Hybrid approaches can leverage both machine learning and elements from knowledge representation such as ontologies and semantic networks in order to detect semantics that are expressed in a subtle manner, e.g., through the analysis of concepts that do not explicitly convey relevant information, but which are implicitly linked to other concepts that do explicitly convey relevant information.

Software tools can deploy machine learning, statistics, and natural language processing techniques. Knowledge-based systems can make use of publicly available resources, to extract the semantic and affective information associated with natural language concepts. Sentiment analysis can also be performed on visual or tactile content, i.e., images and videos.

The Tone Analyzer™ service of IBM Watson® uses linguistic analysis to detect three types of tones from written text: sentiments, social tendencies, and writing style. Sentiments identified include "anger," "fear," "joy," "sadness," and "disgust." Identified social tendencies include Big Five personality traits used by some psychologists. These include "openness," "conscientiousness," "extraversion," "agreeableness," and "emotional range." Identified writing styles include "confident," "analytical," and "tentative." The Tone Analyzer™ service of IBM Watson® can process input JavaScript Object Notation (JSON) or plain text that contains textual based content into the service. The Tone Analyzer™ service of IBM Watson® can return tone analysis results in JSON that analyzes the tone for the input textual based content.

One or more sentiment parameter determined by processing at block 1107 can include e.g. an "anger" sentiment parameter, a "disgust" sentiment parameter, a "fear" sentiment parameter, a "joy" sentiment parameter, and/or a "sadness" sentiment parameter. In one embodiment, a sentiment parameter can include a score on a scale of 0.00 to 1.00 that indicates the likelihood that the sentiment exists in the message. A score of 0.00 can indicate a 0% likelihood that the sentiment exists and the score of 1.00 can indicate a 100% likelihood that a sentiment exists.

At block 1108 manager system 110 can perform outputting an alert based on a result of the processing at block 1107. In one embodiment, where the processing determines that anger is present (e.g. by the detection of an anger sentiment scoring parameter of more than predetermined likelihood) manager system 110 can perform outputting at block 1108 by activating an audible indicator that is not activated when anger is not detected. In one embodiment, where the processing determines that anger is present (e.g. by there being an anger scoring parameter score of more than a predetermined percentage) manager system 110 can perform outputting at block 1108 by increasing volume of an audible indicator that is activated when anger is not detected.

In one embodiment outputting an alert at block 1108 can include triggering certain functions of an indicator of a user computer device.

Figure 7:
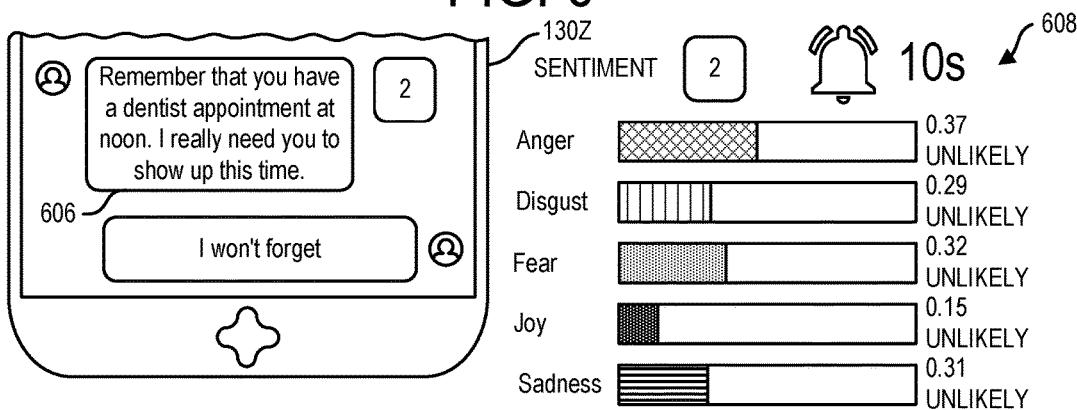
Figure 8:
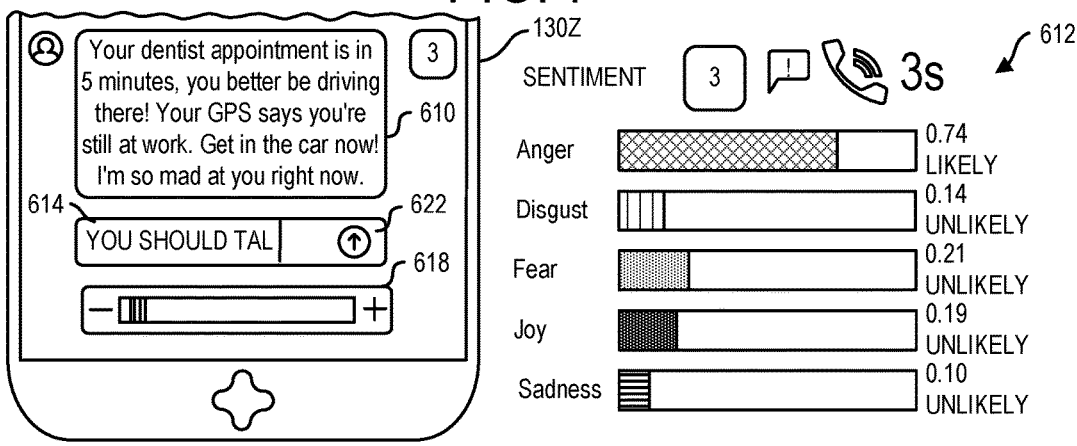

At block 1109 manager system 110 can return to block 1103 to receive a next message. Details of system 100 in one embodiment are described with reference to FIGS. 6-8 illustrating possible results of manager system 110 processing different textual based messages.

Figure 6:
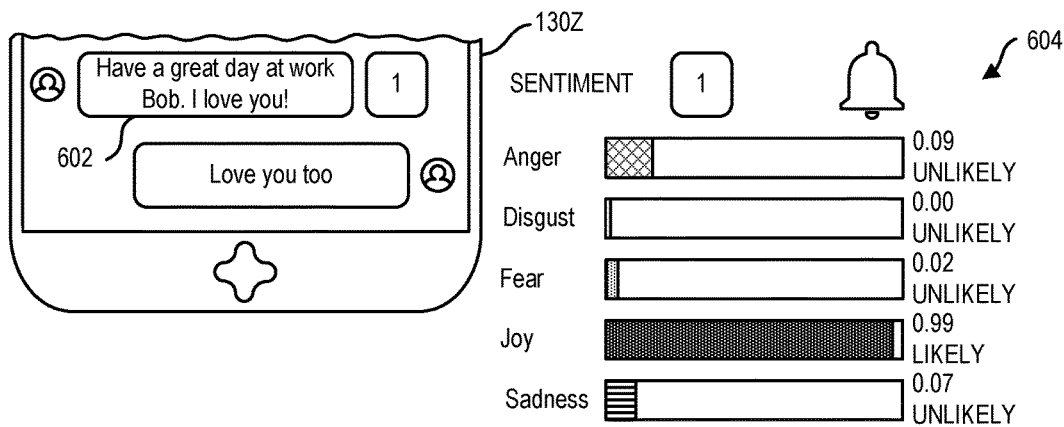
FIGS. 6-8 are depictions of textual based messages and sentiment graphs in one embodiment.

Referring to the example of FIG. 6 manager system 110 during a first pass through block 1107 can process the textual based message having the content "Have a great day at work Bob. I love you!". Referring to the example of FIG. 7 manager system 110 during a second pass through block 1107 can process the textual based message 606 having the content "Remember that you have a dentist appointment at noon. I really need you to show up this time." Referring to the example of FIG. 8 Manager system 110 during a third pass through block 1107 can process the textual based message 610 having the content "Your dentist appointment is in 5 minutes, you better be driving there! Your GPS says you're still at work. Get in the car now! I'm so mad at you right now". FIGS. 6-8 show sentiment parameters that can be determined by manager system 110 for the respective textual based messages. Sentiment graph 604 is a sentiment graph for textual based message 602, sentiment graph 608 is a sentiment graph for textual based message 606 and sentiment graph 612 is a sentiment graph for textual based message 610

As noted, manager system 110 can determine that an alert condition is present if a sentiment scoring parameter is above a predetermined percent. The predetermined percent can be 50% in one embodiment (50% below not giving rise to the notification, above 50% giving rise to the alert condition). Using the 50% as the scoring threshold and the sentiment parameter of the "anger" sentiment parameter classification, manager system 110 in the example of FIG. 6-8, may determine that the example of textual based messages 602 and 606 (FIGS. 6 and 7 respectively) do not give rise to the alert condition and that the example of textual based message 610 (FIG. 8) does give rise to the alert condition. In the example of FIG. 8 outputting an alert can include triggering activation of an audible indicator to beep repeatedly until a text message is responded to.

In some embodiments, alert conditions can be determined based on criteria other than a scoring parameter exceeding a predetermined value. For example, a threshold used can be user configurable rather than predetermined as set forth further herein.

Embodiments herein recognize that it may be advantageous to establish dynamically varying alert conditions that dynamically and adaptively vary between users and/or over time. In one embodiment, system 100 can be configured so that a sentiment scoring threshold for use in determining an alert condition can be dynamically and adaptively variable based on a baseline sentiment parameter for one or more user. A baseline sentiment parameter can be a predicted sentiment parameter for a current message based on a history of textual based messages of a user. Embodiments herein recognize that in some embodiments it can be advantageous to provide notification to users not based on an objective determined sentiment criteria, but on a subjective criteria, e.g. wherein a user texting by sending textual based messages expresses sentiments that are out of character for the text sending user. System 100 can be operative so that when a sending user sends a message that is out of character, manager system 110 can perform outputting an alert.

In one embodiment manager system 110 can periodically update a baseline sentiment parameter for a user. Manager system 110 can update a baseline sentiment parameter for a user of computer device 130A using a history of messages of a user. For example, at block 1106 on receipt of a current message for subjecting to processing at block 1107 for determining one or more sentiment parameter, manager system 110 can update one or more baseline sentiment parameter for the user. Manager system 110 at block 1104 can update a baseline sentiment parameter of a user of computer device 130Z on receipt of a textual based message defined by the user of computer device 130Z. In one embodiment, a baseline sentiment parameter can be determined as the average of sentiment parameters for each message in a history of usage of a user. In another embodiment, a sliding time window can be used so that only N most recent messages are considered in the calculation. In one embodiment, weights can be added to the calculation so that sentiment parameters of more recent messages closer in time to the current time are weighted more heavily than sentiment parameters of messages farther in time from the current time. As illustrated e.g. by the machine learning processes set forth herein for determining an updated sentiment parameter for a user embodiments herein can include machine learning platforms and processes such as machine learning platforms for dynamically and adaptively determining characteristics of user behavior over time.

In one embodiment, manager system 110 at block 1108 can output an alert based on a determining that a value of a sentiment parameter for a current message exceeds a baseline sentiment parameter value by a threshold percentage (e.g. M % of the baseline sentiment parameter). In such manner manager system 110 at block 1108 can perform outputting an alert based on a determining that a user sender sends a message that is out of character for or atypical for that user. An outputting an alert can include in one embodiment, e.g. outputting a communication to control an indicator such as one or more of an audio, visual or tactile indication of a user computer device e.g. computer device 130Z.

In one embodiment, manager system 110 at block 1108 can perform outputting an alert based on sentiment parameters of more than one user. For example, at block 1107 manager system 110 can examine a sentiment parameter of both a sender and a receiver of a current textual based conversation to determine whether to perform outputting of an alert at block 1108. According to an embodiment set forth hereinabove manager system 110 at block 1108 can determine that an alert condition is present if a sentiment parameter for a sent message exceeds a threshold. In one embodiment, a value for such threshold can be determined based on a sentiment parameter of a preceding one or more messages of the user receiving the sent message. Manager system 110 at block 1108 for performing outputting can examine one or more message of a user receiving a sent message being examined to determine an alert condition determining message. For example, a message having an anger sentiment parameter that would ordinarily result in an anger alert condition being determined may not result in an anger condition being determined if the currently sent message is responding itself to a textual based message determined to be an angry message.

In reference e.g. to processing block 1107 and outputting block 1108 embodiments herein can involve various machine artificial intelligence platform and processes e.g. for identifying features in structured data, for informing decision making with historical data and/or for informing decisions with data of groups of users.

Figure 9:
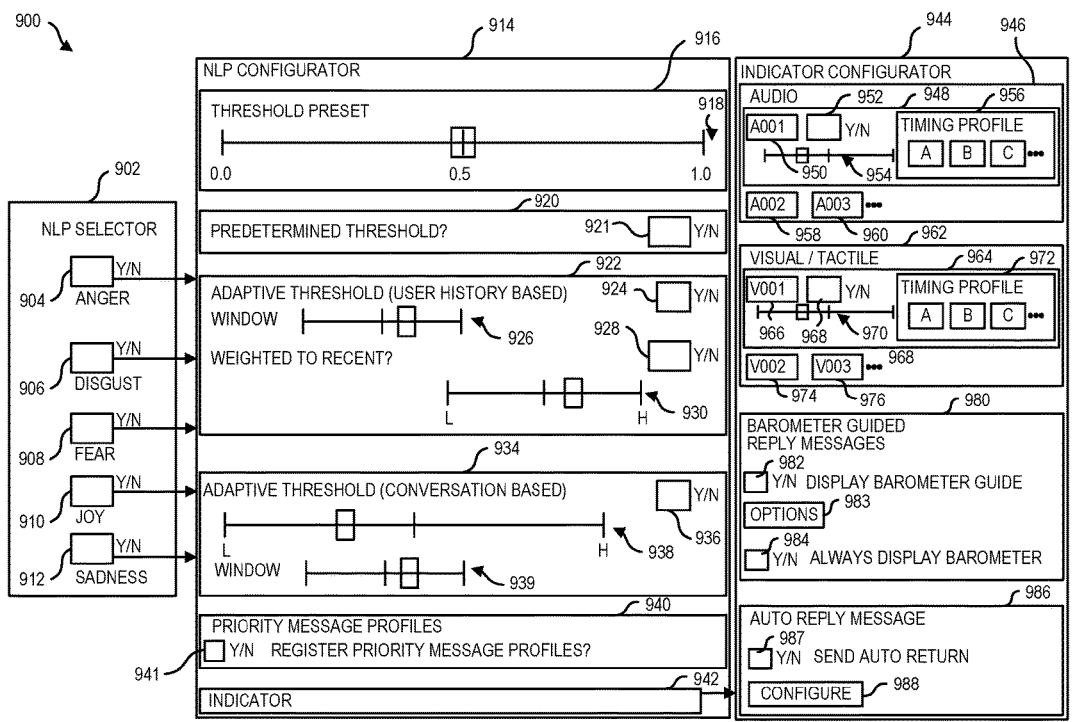
FIG. 9 illustrates an exemplary user interface that can be displayed on a display of a user computer device in one embodiment.

System 100 can be established so that a manner of performing outputting at block 1108 can be user configurable. FIG. 9 illustrates an example of a user interface 900 that can be used by a user to establish configuration settings for use in determining aspects of alerts, which alerts can be output by manager system 110 at block 1108. A user interface is illustrated by the embodiment of FIG. 9 can be displayed on a user interface device of a user computer device, e.g., a display of computer device 130A or computer device 130Z as illustrated in FIG. 1.

Referring to sentiment selector window 902 of user interface 900, sentiment selector window 902 can be used to select sentiment parameters to be determined by manager system 110 during processing as set forth at connection with block 1107.

If box 904 is selected, processing at block 1107 can include processing to determine an "anger" sentiment parameter. If box 906 is selected, processing at block 1107 can include processing to determine a "disgust" sentiment parameter. If box 908 is selected, processing at block 1107 can include processing to determine a "fear" sentiment parameter. If box 910 is selected, processing at block 1107 can include processing to determine a "joy" sentiment parameter. If box 912 is selected, processing at block 1107 can include processing to detect a "sadness" sentiment parameter.

For each sentiment parameter selected using sentiment selector window 902, the user can be presented with a sentiment configurator window 914 of user interface 900 also shown in FIG. 9. Sentiment configurator window 914 can include a threshold preset area 916, predetermined threshold operation selection area 920, an adaptive threshold operation selection area 922, an adaptive threshold operation selection area 934, and an indicator selection area 942.

Referring to area 916, area 916 can be used to establish a threshold preset. Referring to area 920, area 920 can be used to select predetermined threshold based operation. A predetermined threshold based operation can be selected by selecting box 921. When predetermined threshold operation is active outputting at block 1108 can be determined based on whether a sentiment parameter exceeds the threshold preset established using slide selector 918 of area 916.

With the settings shown in FIG. 9, the threshold preset is set to 0.5. Thus, sentiment parameter values above 0.5 will result in an alert condition being detected.

When predetermined threshold operation is active based on box 921 being selected, outputting at block 1108 can be based solely on processing of a current textual based message, e.g., the textual based message received at block 1105 without being dependent on an examining of any other prior textual based messages stored by system 100 authored and defined by the a user whose textual based message is subject to processing at block 1107, or any other user.

User history based adaptive threshold operation can be made active by selection of box 924 of area 922. Conversation based adaptive threshold operation can be made active by selection of box 936 of area 934. When adaptive threshold operation is activated, e.g., by selection of box 924 and/or box 936, outputting at block 1108 can be dependent on an examining of one or more message of system 100 in addition to the textual based message received at block 1105.

When user history based adaptive threshold operation is selected, manager system 110 can bias the threshold preset represented in area 916 in a manner that depends on a sentiment baseline parameter determined for the user as set forth herein which parameter can be continually updated by manager system 110 and which can be based on the history of messages of the user.

If a baseline sentiment parameter increases for a certain user with history based adaptive threshold operation active the threshold preset for the user can be biased upward and a higher sentiment parameter for a textual message subject to processing at block 1107 can be required for outputting of an alert at block 1108. If a baseline sentiment parameter decreases for a certain user with history based adaptive threshold operation active the threshold preset for the user can be biased downward and a lower sentiment parameter for a textual message subject to processing at block 1107 can be required for outputting of an alert at block 1108. In the described scenario a moderately high sentiment parameter value may not trigger an alert where the certain user whose message is being examiner always defines textual messages with high sentiment parameter values, but may trigger an alert where textual based messages of the certain user historically have low sentiment parameter scores. In such a scenario manager system 110 can perform outputting of an alert at block 1107 based on a determining that a certain user sends a textual based message that is out of character for the certain user.

Using area 926, a user can establish a time window for user history-based adaptive threshold operation, e.g., can establish the number of past textual-based messages that are considered in determining and updated baseline sentiment value. Using area 928, the user can select whether the user history-based adaptive threshold operation can be weighted so that more recent messages have a greater effect on the result of the examining. Using area 930, a user can establish a strength selector for user history-based adaptive threshold operation. For example, by using sliding selector of area 930, a user can establish whether determining of an alert condition is to be strongly influenced by the past history of textual message sending or only weakly influenced by past history textual-based message sending.

Referring again to area 934, when conversation-based adaptive threshold operation is activated by selection of box 936, system 100 can be configured so that the threshold preset represented in area 916 can be biased based on content of a text-based conversation among a group of users, e.g., a first and second user.

Using area 934, the user can establish a strength of conversation-based adaptive threshold operation. Using the slide selector 938 of area 934, a user can establish whether the content of a text-based conversation involving a first user and one or more additional users, will strongly effect or only weakly effect an amount by which a threshold preset is to be electronically biased.

Using slide selector 939, the user can select a time window, e.g., can select a number of most recent textual-based messages that are considered in performing an examination according to conversation-based adaptive threshold operation.

Using area 940 of user interface 900, the user can use area 940 to configure manager system 110 to establish priority message profiles. When box 941 is selected by entering "Y" manager system 110 can be operative to identify priority received messages and to register priority message profiles associated to such messages. In one embodiment, when manager system 110 is operative to register priority message profiles, manager system 110 can register a message profile having a set of one or more NLP output parameter output for a received message as a priority message profile based on the received message received by a user being determined to have elicited a priority reply from the user (the user that received the message that satisfied the criteria). When a future incoming message has a message matching a registered priority message profile, manager system 110 can associate an alert condition to the future incoming message.

In one embodiment, for determining whether a received message has elicited a priority response from a user, manager system 110 can monitor characteristics of reply by a user in response to the received message. In order to determine whether a reply satisfies criteria for being a priority reply, manager system 110 can monitor one or more NLP output parameter of a reply message replying to a received message in order to determine whether a message profile for the received message should be registered as a priority message profile. For example, manager system 110 can monitor an "anger" NLP output parameter value of a reply message and if a reply message includes a high "anger" NLP output parameter value, e.g. above a threshold, manager system 110 can register a message profile of the received message as a priority message profile.

In one embodiment, manager system 110 can monitor the speed of a returned reply message for determining whether a message has elicited a priority reply from a user. For example, if the user responds to the received message within a short period of time e.g. a time within the threshold time, manager system 110 can register a message profile for the received message as a priority message profile.

In one embodiment, manager system 110 can monitor a force characteristic e.g. cumulative force, or average force per typed character, of received forces received by a manually operated user interface, e.g. a virtual keyboard, for entry of a reply message typed by a user into a manually operated user interface for reply to a received message. In one embodiment relatively high force inputs, e.g. exceeding a threshold received at a virtual keyboard can be determined to be an indication that the reply typed in reply to a received message is a high priority reply. Manager system 110 based on a user interface force criteria of a reply to a received message can register a message profile of the received message as a priority message profile.

In one embodiment, manager system 110 can monitor a plurality of factors characterizing a reply to a received message for purposes of determining whether the received message should be identified as a priority message having an associated priority message profile subject to registration. For example, the formula as shown in equation 1 can be used. Equation 1 is as follows:

$$P = W1F1 + W2F2 + W3F3 \qquad \text{(Equation 1)}$$

In the referenced example, "P" is an overall score used for predicting that a received message is a priority message subject to registration of an associated priority message profile. "F1" is a factor based on NLP characteristics of a return message, "F2" is a factor based on speed of a reply message, and "F3" is a factor based on keyboard entry force of a reply message. "W1," "W2," and "W3" are weights associated respectively with the various factors. Manager system 110 can register a message profile of a received message as a registered priority message profile on the determination that a reply, replying to the received message has a scoring value "P" exceeding a threshold e.g. a predetermined threshold or dynamic threshold.

A registered priority message profile can include a set of one or more NLP output parameters for a message identified as a priority message e.g. can include one or more sentiment NLP output parameter such as "anger," "disgust," "fear," "joy," and "sadness," one or more topic NLP output parameter (subject matter categories for the message, e.g. "grandmother," "baseball," "taxes," "hospital," "Hawaii" and the like) and/or other NLP output parameters for the message such as social tendencies NLP output parameters e.g. "openness," "conscientiousness," "extraversion," "agreeableness," and "emotional range" and/or writing style NLP output parameters e.g. "confident," "analytical," and "tentative." When a message profile is registered as a registered priority message profile, manager system 110 can monitor incoming received messages for profiles that match a registered priority message profile. Various pattern recognition processes can be used to determine whether a matching condition has occurred including one or more of classification algorithms, clustering algorithms, ensemble learning algorithms, and/or regression algorithms. When manager system 110 receives an incoming received message having a profile matching a registered priority message profile, manager system 110 can associate an alert condition to the incoming received message and can proceed to outputting an alert as set forth herein.

Referring further to user interface 900 of FIG. 9, when a user activates a selection using indicator selection area 942, the user can be presented an indicator configurator window 944, which allows the user to establish configuration options facilitating configuration of indicators having operation to be effected by an alert. Indicator configurator window 944 can include area 946.

Using area 946, a user can select one or more audio indicators for configuration in accordance with an alert. In area 950, there can be displayed an identifier for a certain audio indicator, e.g., the audio indicator having identifier A001. In area 948 there can be displayed a box 952, which when selected, activates configuration of the indicator indicated by the identifier of area 950. Using slide selector 954, a user can establish an output level for a device, e.g., a volume level or amplification level for an audio indicator.

Using area 956, a user can select one of several candidate timing profile options, involving, e.g., a beep delay and/or a beeping pattern. Buttons 958 and 960 of area 946 are buttons indicating additional audio indicators that can be subject to configuration. When one of the buttons is selected, the fuller configuration area, such as area 948, can be presented for the selected indicator.

Audio indicators that can be configured using area 946 can include one or more indicators that is normally operational when a textual-based message is received without an alert condition being determined, but whose operation is altered when there is a detected alert condition. Audio indicators selected using area 946 can include one or more audio indicator that is not normally active when a textual-based message is received without determining of an alert condition and which is only activated when there is an alert condition determined as part of performing an outputting at block 1108.

Regarding area 962, area 962 permits configuration of one or more visual or tactile output indicators. Referring to area 964, there can be displayed in area 966 an identifier for a given visual or tactile indicator. In the example of FIG. 9 the identifier V001 is displayed that specifies the certain indicator identified by identifier V001. On selection of box 968, configuration of the indicator identified in area 966 can be activated.

Box 968 can be used for selection of the identified indicator in area 966 as an indicator for configuration. Slide selector 970 can permit configuration of an output characteristic of the selected indicator, e.g., brightness and/or font size (visual indicator setting), vibration force and/or vibration amplitude.

In area 972, the user can be presented with numerous timing profile options to select a timing profile from candidate profiles involving e.g. a flashing timing or pattern (visual indicator), a vibration pattern (tactile indicator).

Referring to buttons 974 and 976, a user can select one or more additional visual or tactile indicators for configuration of a visual or tactile alert. The visual or tactile indicator selected for configuration using area 962, can be a visual or tactile indicator that is normally active when there is receipt of a textual-based message without an alert condition being present whose operation is changed by the detecting of an alert condition. A visual or tactile indicator that can be configured using area 962 can alternatively be a visual or tactile indicator that is not normally active when there is receipt of a text message without an alert condition being determined, but which is operational only when there is a determination of an alert condition on the performing of outputting at block 1108.

Other indicators can be configured. For example, referring to area 980, a user can configure an alert so that reply messages replying to a received message satisfying an alert condition are guided by a displayed barometer. A displayed barometer can aid a user in drafting a reply message by displaying a barometer that varies depending on one or more characteristic of the message being drafted (e.g. based on one or more NLP output parameter of the in-draft message being drafted) so that the user is given real-time feedback as to characteristics of the message being drafted before it is sent. For facilitation of barometer guided reply message functionality, manager system 110 can repeatedly run NLP process 1002 to process in-draft reply messages so that in-draft reply messages being drafted by a user in reply to a received massage are subject to NLP processing.

When box 982 is selected, a barometer can be displayed on a user display when the user is drafting a reply message in reply to a received message satisfying an alert condition. For example, referring to FIG. 8 the user can be drafting a reply message replying to textual based message 610. In area 614, a display of user computer device 130Z can be displaying text of a current message being drafted e.g. the in-draft form message "YOU SHOULD TAL|".

With area 614 displaying the current message being drafted, the display of user computer device of 130Z can also be displaying a barometer in barometer area 618. The barometer can display an indication of one or more characteristic of a message being drafted and being displayed in draft form in area 614. In one example, the characteristic can be based on one or more NLP output parameter output by NLP process run on the in-draft message being drafted. In one example, the one or more NLP output parameter can be a polar output sentiment parameter for a message being drafted e.g. the barometer in one embodiment can indicate a value of negative sentiment and or positive sentiment for the in-draft message being drafted by a user. In one example, the barometer area 618 can display a barometer indicating one or more characteristic of an in-draft reply message based on a combination of NLP output parameters. For example, in one embodiment the barometer displayed barometer area 618 can be a multi-scale barometer displaying a sentiment graph according to the format of sentiment graph 612 as shown in FIG. 8 except instead of illustrating a sentiment graph for the received message it will display a sentiment graph for the current in-draft reply message currently being drafted by the user.

It will be seen that a user can be prompted by a displayed barometer to draft and in some cased repeatedly re-draft a message until the barometer indicates that the in-draft reply message has characteristics being targeted. For example, in the case the barometer displayed in barometer area 618 tracks a positive or negative sentiment with indicated values tending to the right indicating a more positive sentiment the user drafting a reply message can be prompted by the displayed barometer to repeatedly re-draft a message until the barometer displays a value sufficiently to the right to indicate a message having a targeted value for positive sentiment. When the barometer indicates that a targeted positive sentiment value for the reply message being drafted has been achieved, the user drafting the reply message can actuate send button 622 to initiate sending of the message.

In one embodiment, the barometer displayed in barometer area 618 can be based on the value of one non-polar sentiment NLP output parameter e.g. just "anger," just "disgust," just "fear," just "joy," or just "sadness." In one embodiment, the barometer can indicate an output of a combination of non-bipolar sentiment parameters for the current message currently being drafted. For example, a combination of the sentiment parameters "anger," "disgust," and "sadness" or any two or more of the sentiment parameters "anger," "disgust," "fear," joy," and "sadness". In any case, when the displayed barometer indicates that the message being drafted has characteristics that are desired by the user drafting the reply message the user can select send button 622 to send the message. In some cases for example, a user may desire to send a return message that has a low value for the "anger" sentiment and a high value for the "joy" sentiment and the barometer displayed in barometer area 618 can aid the user in drafting such a message. In other cases, a user may wish to draft a return message that has a high value for the "anger" sentiment and a low value for the "joy" sentiment NLP output parameter and the barometer displayed in area 618 can also aide in the drafting of such message.

On selection of options button 983, user can be presented options for use in configuring barometer guided reply messages e.g. the types of sentiment NLP output parameter(s) or other NLP output parameter(s) to be examined in the barometer generation. One option that can be selected can be to restrict the sending of a reply message unless certain criteria of an in-draft reply message being drafted are satisfied. Such criteria can be indicated to be satisfied by a displayed barometer. In one example, the criteria can include an "anger" sentiment parameter criteria. For example, system 100 can be configured so that the sending of a reply message is restricted e.g. including by disabling of send button 622 unless the current in-draft reply message being drafted has an "anger" NLP output parameter value of less than a threshold value. In such manner, a user can be restricted from sending angry return messages as measured by a value of an "anger" sentiment NLP output parameter of a reply message being drafted.

By selection of box 984 a user can configure system 100 so that system 100 always displays a barometer to guide the drafting of return messages regardless of whether an alert has been determined for the received message being replied to. If box 982 is selected without box 984 being selected system 100 can be configured so that the barometer displayed in barometer area 618 guiding return messages is selectively displayed for received messages determined to satisfy an alert condition but is not displayed for other messages that do not satisfy an alert condition. In such manner, the display of a barometer in barometer area 618 serves as an indicator of an alert condition. Also, by restricting the barometer from being displayed for messages that do not satisfy an alert condition a potential distraction to a user can be avoided.

Using area 986 of user interface 900 a user can configure auto-return messages. In one embodiment, system 100 can be configured to generate an auto-return message on receipt of a received message that satisfies an alert condition. An auto-return message can be activated by selection of block 987 and the content of an auto-return message can be configured on the selection of 988 which on selection can present a text area allowing the user to define an auto-return message. When auto-return message functionality is activated, system 100 can be configured so that a user computer device e.g. computer device 130A can automatically send a quick pre-formatted reply message on receipt of a received message satisfying an alert condition as set forth herein. The pre-defined content of the auto-return message can be e.g. "I HAVE RECEIVED YOUR MESSAGE AND REGARD IT TO BE URGENT. I WILL REPLY SHORTLY." The auto-sending of a reply message can serve as an alert indicating that an alert condition has been satisfied and that the alert condition has been associated to a received message.

Certain embodiments herein may offer various technical computing advantages, involving computing advantages to address problems arising in the realm of computer networks such as processing delays and information acquisition delays resulting from a user failing to respond appropriately to a textual based message. Embodiments herein can reduce or eliminate critical processing and data acquisition delays in a variety of emergency situations (health or business) involving online computer network environments. Embodiments herein can provide results and advantages that are not possible or practical without use of components of technical computing environment, such as providing for intelligent structuring of data and for examining structured data for determination of alert conditions. Embodiments herein can involve various machine artificial intelligence platforms, e.g. for identifying features in structured data, for informing decision making with historical data and/or for informing decisions with data of groups of users. Embodiments herein can involve various machine artificial intelligence platforms that provide processes exceeding capacities of human cognition including processes for discerning characteristics of messages based on machine performed classification. Embodiments herein can include machine learning platforms and processes such as machine learning platforms and processes for dynamically and adaptively determining characteristics of user behavior over time, and machine learning platforms and processes for dynamically and adaptively determining priority messages for purposes of registration of priority message profiles which can be used to recognize incoming priority messages.

Certain embodiments herein may offer various technical computing advantages, involving computing advantages to address problems arising in the realm of computer networks such as processing delaying and information acquisition delays resulting from a user.

Figure 10:
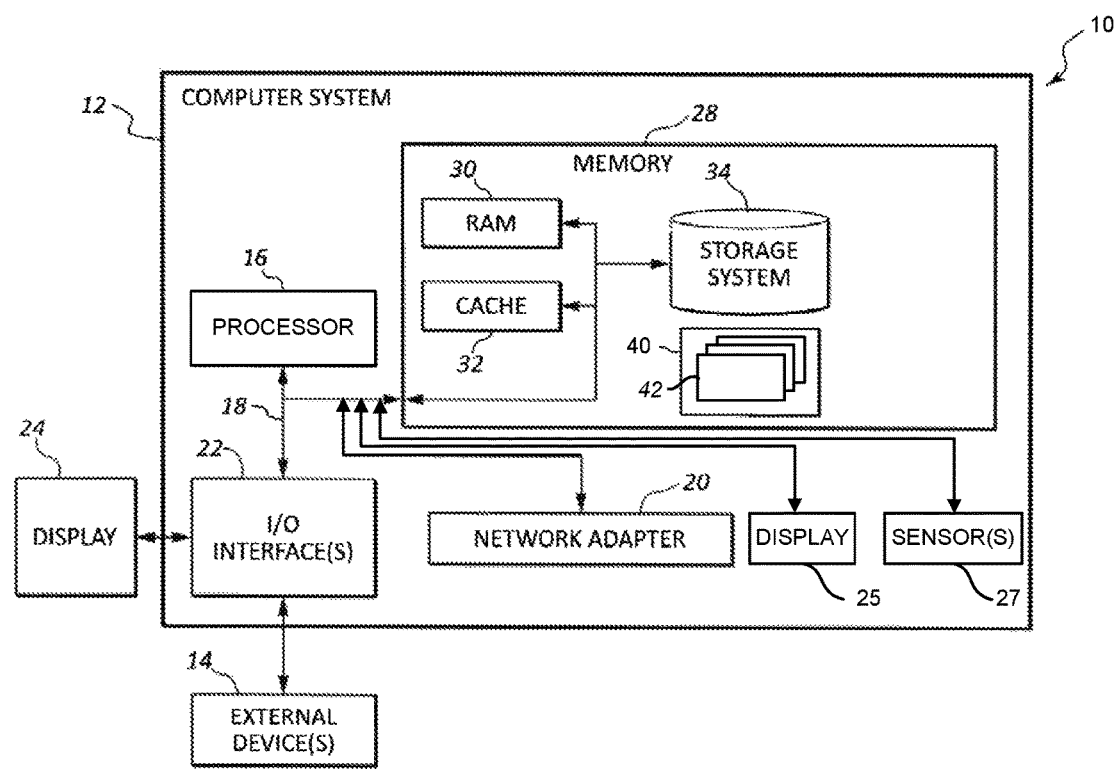
FIG. 10 depicts a computing node according to one embodiment.
Figure 11:
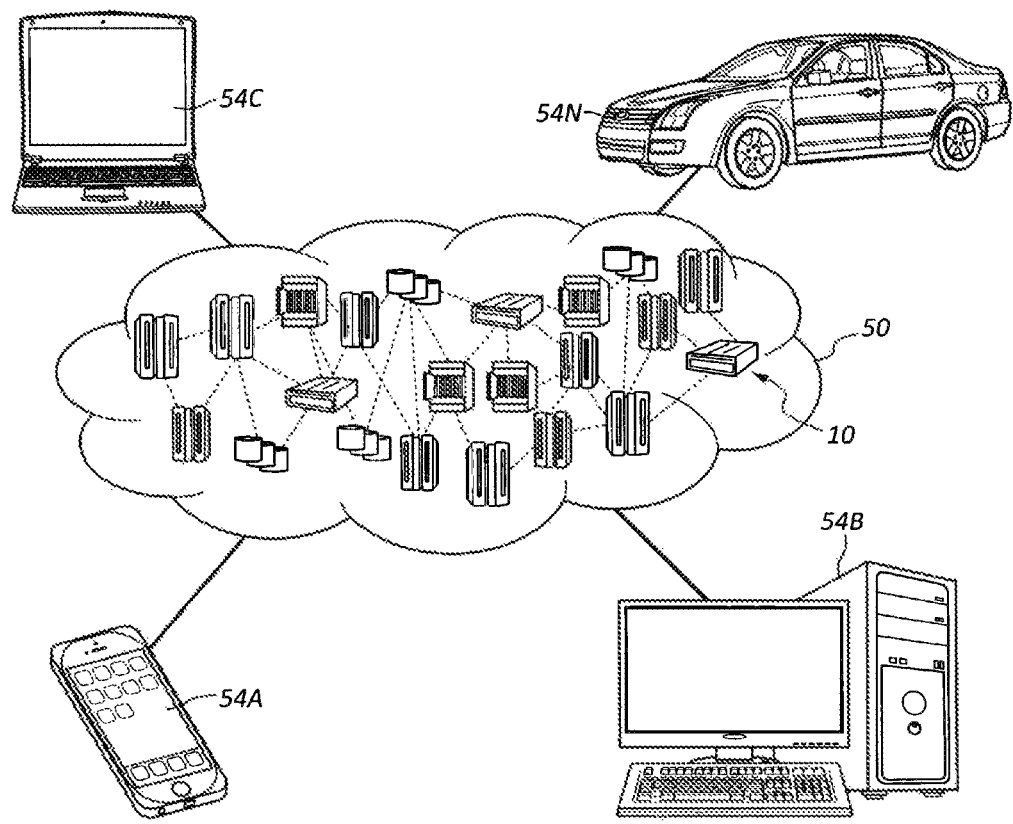
FIG. 11 depicts a cloud computing environment according to one embodiment.
Figure 12:
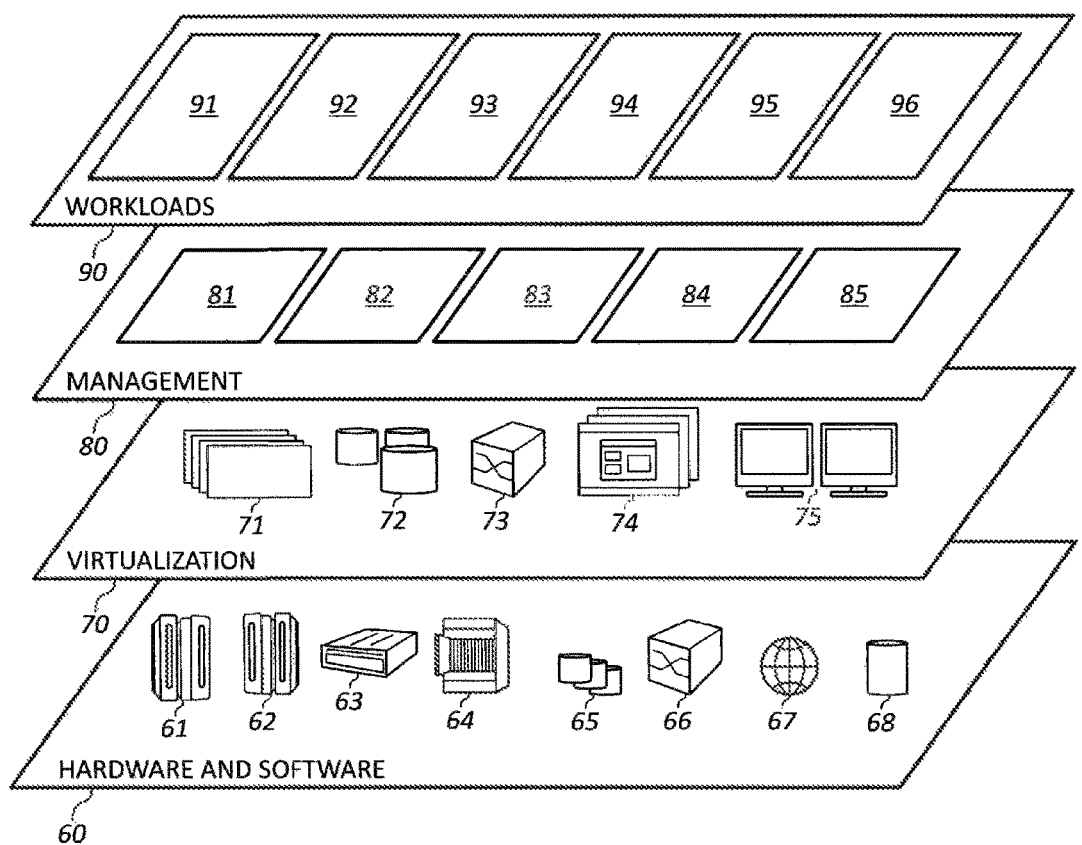
FIG. 12 depicts abstraction model layers according to one embodiment.

FIGS. 10-12 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 10, a schematic of an example of a computing node is shown. Computing node 10 is only one example of a computing node suitable for use as a cloud computing node and is not intended to suggest any limitation as to the scope of use or functionality of embodiments of the invention described herein. Regardless, computing node 10 is capable of being implemented and/or performing any of the functionality set forth hereinabove. Computing node 10 can be implemented as a cloud computing node in a cloud computing environment, or can be implemented as a computing node in a computing environment other than a cloud computing environment.

In computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 10, computer system 12 in computing node 10 is shown in the form of a general-purpose computing device. The components of computer system 12 may include, but are not limited to, one or more processors 16, a system memory 28, and a bus 18 that couples various system components including system memory 28 to processor 16. In one embodiment, computing node 10 is a computing node of a non-cloud computing environment. In one embodiment, computing node 10 is a computing node of a cloud computing environment as set forth herein in connection with FIGS. 11-12.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. One or more program 40 including program processes 42 can generally carry out the functions set forth herein. In one embodiment, manager system 110 can include one or more computing node 10 and can include one or more program 40 for performing functions described with reference to method 200 of the flowchart of FIG. 4. In one embodiment, manager system 110 can include one or more computing node 10 and can include one or more program 40 for performing functions described with reference to manager system 110 as set forth in reference to the flowchart of FIG. 5. In one embodiment, manager system 110 can include one or more computing node 10 and can include one or more program 40 for performing functions described with reference to messaging system 120 as set forth in reference to the flowchart of FIG. 5. In one embodiment, manager system 110 can include one or more computing node 10 and can include one or more program 40 for performing functions described with reference to a user computer device e.g. computer device 130A or computer device 130Z as set forth in reference to the flowchart of FIG. 5.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc. In addition to or in place of having external devices 14 and display 24, which can be configured to provide user interface functionality, computing node 10 in one embodiment can include display 25 connected to bus 18. In one embodiment, display 25 can be configured as a touch screen display and can be configured to provide user interface functionality. Computer system 12 in one embodiment can also include one or more sensor device 27 connected to bus 18. One or more sensor device 27 can alternatively be connected through I/O interface(s) 22. One or more sensor device 27 can include a Global Positioning Sensor (GPS) device in one embodiment and can be configured to provide a location of computing node 10. In one embodiment, one or more sensor device 27 can alternatively or in addition include, e.g., one or more of a camera, a gyroscope, a temperature sensor, a humidity sensor, a pulse sensor, a blood pressure (bp) sensor or an audio input device. Computer system 12 can include one or more network adapter 20. In FIG. 11 computing node 10 is described as being implemented in a cloud computing environment and accordingly is referred to as a cloud computing node in the context of FIG. 11.

Referring now to FIG. 11, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Referring now to FIG. 12, a set of functional abstraction layers provided by cloud computing environment 50 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components 96 for processing textual based messages and outputting alerts as set forth herein. The processing components 96 can be implemented with use of one or more program 40 described in FIG. 10.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. In addition, forms of the term "based on" can encompass relationships where elements are partially based on as well as relationships where elements are entirely based on. Furthermore, a device or structure that is configured in a certain way is configured in at least that way, but may also be configured in ways that are not listed. Also, embodiments set forth herein having a certain number of elements can be practiced with less than or greater than the certain number of elements.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A method comprising:
    obtaining, by one or more processor, textual based message data of a messaging system, the textual based message data being data of a textual based message defined by a first user of the messaging system for sending to a second user of the messaging system;
    processing, by the one or more processor, the textual based message data to determine one or more sentiment parameter associated to the textual based message data; and
    outputting, by the one or more processor, an alert based on a result of the processing, wherein the outputting includes outputting the alert to the second user, wherein the outputting includes outputting the alert based on a determining that an alert condition is present and wherein the outputting includes determining that the alert condition is present by determining that a message profile of a received textual based message having the textual based message data matches a registered priority message profile of a set a registered priority message profiles, wherein the method includes activating a machine learning process to register the message profile as a registered priority message profile based on a reply to the received message provided by the second user satisfying criteria, the criteria being based on each of: (a) one or more Natural Language Processing (NLP) output parameter output by subjecting a reply message of the reply to an NLP process, (b) a speed of the reply, and (c) received forces received by a manually operated user interface used by the second user to enter the reply message of the reply.

2. The method of claim 1, wherein the outputting includes further outputting the alert based on an examining of textual based message data of a current textual based conversation between the first user and the second user.

3. The method of claim 1, wherein the outputting includes further outputting the alert based on an examining of a history of textual based messages of the first user.

4. The method of claim 1, wherein the outputting includes outputting the alert based on a determining that an alert condition is present and wherein the outputting an alert includes triggering barometer guided reply message operation by a computer device of the second user, wherein the barometer guided reply message operation is characterized by a barometer being displayed on a display of the computer device that indicates one or more characteristic of an in-draft reply message being drafted by the second user in reply to a received textual based message having the textual based message data, the one or more characteristic being based on one or more NLP output parameter for the in-draft reply message, the one or more NLP output parameter being determined by subjecting the in-draft reply message to processing by an NLP process.

5. The method of claim 1, wherein the outputting includes outputting the alert based on a determining that an alert condition being present and wherein the outputting includes determining that an alert condition is present when a message profile of a received textual based message having the textual based message data matches a registered priority message profile of a set a registered priority message profiles.

6. The method of claim 1, wherein the outputting includes outputting the alert based on a determining that an alert condition is present and wherein the outputting an alert includes triggering an automated reply message to the first user.

7. The method of claim 1, wherein the outputting includes outputting the alert based on an examining of textual based message data of a current textual based conversation between the first user and the second user, wherein the outputting includes outputting the alert based on an examining of a history of textual based messages of the first user.

8. The method of claim 1, wherein the outputting includes outputting the alert based on a determining that an alert condition is present and wherein the outputting includes determining that an alert condition is present by determining that a value of a sentiment parameter of the one or more sentiment parameter exceeds a threshold.

9. The method of claim 1, wherein the outputting includes outputting the alert based on a determining that an alert condition is present and wherein the outputting includes determining that an alert condition is present by determining that a value of a sentiment parameter of the one or more sentiment parameter exceeds a threshold, and wherein the method includes biasing the threshold based one or more of the following selected from the group consisting of (a) a baseline sentiment parameter of the first user determined by examining a history of textual based messaged of the first user, and (b) an examining of a current textual based conversation between the first user and the second user.

10. The method of claim 1, wherein the processing the textual based message data to determine one or more sentiment parameter associated to the textual based message data includes processing the textual based message data to determine first and second sentiment parameters associated to the textual based message data, the first sentiment parameter being of a first sentiment parameter classification and the second sentiment parameter being of a second sentiment parameter classification, wherein performing the outputting includes examining user configuration data defined by the second user that specify one or more sentiment parameter classifications for examination for determining whether an alert condition is present.

11. The method of claim 1, wherein performing the outputting includes examining user configuration data defined by the second user that specifies one or more sentiment parameter classification as an alert triggering classification for examination for determining whether an alert condition is present, wherein the outputting includes examining the textual based message data for determining an alert condition for triggering the alert based on a value of a first a sentiment parameter classification, the first sentiment parameter classification being specified in the user configuration data as an alert triggering classification, wherein the outputting includes examining the message data for determining an alert condition for triggering the alert based on a value of a second sentiment parameter classification, the second sentiment parameter classification being specified in the user configuration data as an alert triggering classification.

12. The method of claim 1, wherein the processing includes processing of the textual based message data to determine each of (a) one or more topic NLP output parameter, (b) one or more sentiment NLP output parameter, (c) one or more social tendencies NLP output parameter, and (d) one or more writing style NLP output parameter associated to the textual based message data, and wherein the outputting includes outputting the alert based on an examining of each of the (a) one or more topic NLP output parameter, (b) one or more sentiment NLP output parameter, (c) one or more social tendencies NLP output parameter, and (d) one or more writing style NLP output parameter.

13. The method of claim 1, wherein the outputting includes outputting an alert based on a determining that an alert condition is present and wherein the outputting an alert includes triggering guided reply message operation by a computer device of the second user, wherein the guided reply message operation is characterized by sentiment indicators being displayed to the second user on a display of the computer device of the second user that indicates one or more characteristic of an unsent in-draft reply message being drafted by the second user in reply to received textual based message having the textual based message data.

14. The method of claim 1, wherein the outputting includes outputting an alert based on a determining that an alert condition is present and wherein the outputting an alert includes triggering guided reply message operation by a computer device of the second user, wherein the guided reply message operation guides the second user by presenting an indicator of sentiment to the second user so that the second user can observe the indicator of sentiment of an in-draft reply message being drafted by the second user prior to any reply message based on the in-draft reply message being sent to the first user by the second user, wherein the guided reply message operation is characterized by a sentiment indicator being displayed to the second user on a display of the computer device of the second user that indicates one or more sentiment characteristic of an unsent in-draft reply message being drafted by the second user in reply to received textual based message having the textual based message data.

15. The method of claim 1, wherein performing the outputting includes examining user configuration data defined by the second user that specifies one or more sentiment parameter classification as an alert triggering classification for examination for determining whether an alert condition is present, wherein the outputting includes examining the textual based message data for determining an alert condition for triggering the alert based on a value of a first a sentiment parameter classification, the first sentiment parameter classification being specified in the user configuration data as an alert triggering classification, wherein the outputting includes examining the message data for determining an alert condition for triggering the alert based on a value of a second sentiment parameter classification, the second sentiment parameter classification being specified in the user configuration data as an alert triggering classification, wherein the first sentiment parameter classification is an anger sentiment parameter classification, wherein the second parameter classification is a fear sentiment parameter classification.

16. A computer program product comprising:
a computer readable storage medium readable by one or more processing unit and storing instructions for execution by one or more processor for performing a method comprising:
obtaining textual based message data of a messaging system, the textual based message data being data of a textual based message defined by a first user of the messaging system for sending to a second user of the messaging system;
processing the textual based message data to determine one or more sentiment parameter associated to the textual based message data; and
outputting an alert based on a result of the processing, wherein the outputting includes outputting the alert to the second user, wherein the outputting includes outputting the alert based on a determining that an alert condition is present and wherein the outputting includes determining that the alert condition is present by determining that a message profile of a received textual based message having the textual based message data matches a registered priority message profile of a set a registered priority message profiles, wherein the method includes activating a machine learning process to register the message profile as a registered priority message profile based on a reply to the received message provided by the second user satisfying criteria, the criteria being based on each of: (a) one or more Natural Language Processing (NLP) output parameter output by subjecting a reply message of the reply to an NLP process, (b) a speed of the reply, and (c) received forces received by a manually operated user interface used by the second user to enter the reply message of the reply.

17. The computer program product of claim 16, wherein the outputting includes outputting the alert based on a determining that an alert condition is present and wherein the determining that an alert condition is present includes determining that a value of a sentiment parameter of the one or more sentiment parameter exceeds a threshold.

18. The computer program product of claim 16, wherein the outputting includes outputting determining that an alert condition is present and wherein the outputting includes determining that an alert condition is present by determining that a value of a sentiment parameter of the one or more sentiment parameter exceeds a threshold, and wherein the method includes biasing the threshold based on each of (a) a baseline sentiment parameter of the first user determined by examining a history of textual based messaged of the first user, and (b) an examining of a current textual based conversation between the first user and the second user.

19. A system comprising:
a memory;
at least one processor in communication with memory; and
program instructions executable by one or more processor via the memory to perform a method comprising:
obtaining textual based message data of a messaging system, the textual based message data being data of a textual based message defined by a first user of the messaging system for sending to a second user of the messaging system;
processing the textual based message data to determine one or more sentiment parameter associated to the textual based message data; and
outputting an alert based on a result of the processing, wherein the outputting includes outputting the alert to the second user, wherein the outputting includes outputting the alert based on a determining that an alert condition is present and wherein the outputting includes determining that the alert condition is present by determining that a message profile of a received textual based message having the textual based message data matches a registered priority message profile of a set a registered priority message profiles, wherein the method includes activating a machine learning process to register the message profile as a registered priority message profile based on a reply to the received message provided by the second user satisfying criteria, the criteria being based on each of: (a) one or more Natural Language Processing (NLP) output parameter output by subjecting a reply message of the reply to an NLP process, (b) a speed of the reply, and (c) received forces received by a manually operated user interface used by the second user to enter the reply message of the reply.

* * * * *